(12) United States Patent
Ratcliff, III

(10) Patent No.: US 6,996,548 B2
(45) Date of Patent: Feb. 7, 2006

(54) METHOD AND APPARATUS FOR PROVIDING A REWARD FOR THE USE OF A PROCESSOR IN A PARALLEL PROCESSING ENVIRONMENT

(75) Inventor: Raymond F. Ratcliff, III, Plano, TX (US)

(73) Assignee: Hemisphere II Investment LP, Palm Beach, FL (US)

( * ) Notice: Subject to any disclaimer, the term of this patent is extended or adjusted under 35 U.S.C. 154(b) by 420 days.

(21) Appl. No.: 09/853,841

(22) Filed: May 11, 2001

(65) Prior Publication Data

US 2002/0198769 A1 Dec. 26, 2002

(51) Int. Cl.
*G06F 15/18* (2006.01)

(52) U.S. Cl. .............................. 706/14; 706/11; 706/10
(58) Field of Classification Search .................. 706/14, 706/11, 10; 709/201
See application file for complete search history.

(56) References Cited

U.S. PATENT DOCUMENTS

| | | | | |
|---|---|---|---|---|
| 5,655,081 | A | 8/1997 | Bonnell et al. | ........ 395/200.32 |
| 5,680,548 | A | 10/1997 | Trugman | |
| 5,740,549 | A | 4/1998 | Reilly et al. | ................... 705/14 |
| 5,978,594 | A | 11/1999 | Bonnell et al. | ............. 395/837 |
| 5,978,829 | A | 11/1999 | Chung et al. | |
| 6,041,398 | A | 3/2000 | Pechanek | |
| 6,112,225 | A | 8/2000 | Kraft et al. | ................... 709/202 |
| 6,167,428 | A | 12/2000 | Ellis | |
| 6,510,509 | B1 | 1/2003 | Chopra | |
| 6,725,250 | B1 | 4/2004 | Ellis, III | |
| 6,732,141 | B2 | 5/2004 | Ellis | |
| 2001/0039497 | A1 * | 11/2001 | Hubbard | ........................ 705/1 |
| 2002/0013832 | A1 * | 1/2002 | Hubbard | ..................... 709/220 |
| 2002/0019844 | A1 * | 2/2002 | Kurowski et al. | .......... 709/201 |
| 2002/0111210 | A1 * | 8/2002 | Luciano et al. | ............... 463/29 |
| 2003/0055679 | A1 * | 3/2003 | Soll et al. | ....................... 705/2 |
| 2003/0157976 | A1 * | 8/2003 | Simon et al. | ................... 463/1 |

OTHER PUBLICATIONS

Eric Korpela et al, SETI@HOME—Massively Distributed Computing for SETI, Jan. 2001, Scientific Programming (IEEE), 78–83.*

W. T. Sullivan, III, "A new major SETI project based on Project Serendip data and 100,000 personal computers", published in "Astronomical and Biochemical Origins and teh Search for Life in the Universe" (1997).

* cited by examiner

*Primary Examiner*—Joseph P. Hirl
(74) *Attorney, Agent, or Firm*—DLA Piper Rudnick Gray Cary US LLP

(57) ABSTRACT

A parallel data processing system in which a plurality of data processing devices are coupled to a data network. Each of the data processing devices has a processor and a memory coupled to the processor. A reward is provided for use of the processors. A job includes a plurality of tasks. Responsive to a request signal from one of the data processing devices, one of the tasks is sent to the one data processing device over the data network. The one task is stored in the memory of the one data processing device. The processor of the one data processing device retrieves the one task from the memory. The processor of the one data processing device performs the one task to define a result. After defining the result, the reward is provided to a recipient associated with the one data processing device.

26 Claims, 4 Drawing Sheets

METHOD AND APPARATUS FOR PROVIDING A REWARD FOR THE USE OF A PROCESSOR IN A PARALLEL PROCESSING ENVIRONMENT

FIELD

The present invention relates generally to parallel processing and, more particularly, to providing a reward for the use of a processor in a parallel processing environment.

BACKGROUND

Modern organizations, particularly technology driven organizations, have a constant need to innovate. Unfortunately, innovation is often hindered by an existing lack of technology to properly explore new technologies. In a sense, future technologies are "stacked" upon previous technologies. That is, without a proper technological foundation, there is no support for technological innovation. It is difficult to skip generations of technology.

One technology often needed to support innovation is data processing power. Modern organizations require processing power for many different purposes. Technology companies, for instance, rely on processing power for research and development ("R&D") efforts. Pharmaceutical research companies spend large sums of money on the latest data processing equipment to discover and test new drug compounds. Financial institutions need processing power for stock trend modeling and other computation-intensive activities. Defense contractors need processing power to test new missile designs. While these various organizations operate in different industries, each would benefit by owning or having access to computer systems that offer more data processing power.

At any given time, there are millions of unused data processing devices throughout the world. Workstations, personal computers, laptop computers, personal digital assistants ("PDAs") are often not in use. Many computers sit in a room overnight, during meals, and sometimes throughout the workday. Further, even when people are using these data processing devices, the devices rarely operate at full capacity. The processors in these data processing devices are often available to provide data processing for others.

Data processing devices are possessed by various entities including corporations, academic institutions, and private individuals. These entities, however, are generally only concerned with solving their particular problems. The entities described above have no incentive to share the processing power of their respective devices with others. Thus, most never consider the greater need for data processing power.

SUMMARY

One aspect of the present invention relates to a method performed in a parallel data processing system. A plurality of data processing devices are coupled to a data network. Each of the data processing devices has a processor and a memory coupled to the processor. The method involves providing a reward for use of the processors of the data processing devices. An algorithm and data are provided. The algorithm includes a plurality of algorithm portions. The data includes a plurality of data portions. A task is defined to include one of the algorithm portions and one of the data portions. Responsive to a request signal from one of the data processing devices, the task is sent to the one data processing device over the data network. The task is stored in the memory of the one data processing device. The one algorithm portion and the one data portion are extracted from the task. The processor of the one data processing device retrieves the one algorithm portion and the one data portion from the memory of the one data processing device. The processor of the one data processing device performs the one algorithm portion on the one data portion. When the processor of the one data processing device has performed the one algorithm portion on the one data portion, the reward is provided to a recipient associated with the one data processing device.

Another aspect of the present invention relates to a method performed in a parallel data processing system including a plurality of data processing devices coupled to a data network. Each of the data processing devices has a processor and a memory coupled to the processor. Each data processing device is associated with a respective recipient. A reward is provided for use of the data processing devices. Instructions representing a portion of an algorithm are provided. The instructions are stored in the memory of one of the data processing devices. A portion of data is sent to the one data processing device. The portion of data is stored in the memory of the one data processing device. The processor of the one data processing device retrieves the data and the instructions from the memory. The instructions are executed by the processor of the one data processing device to perform the portion of the algorithm on the data. The reward is provided to the recipient associated with the one data processing device.

Yet another aspect of the present invention relates to a parallel data processing system for providing a reward for use of one of a plurality of processing devices to process data using an algorithm. The data includes a plurality of data portions. The algorithm includes a plurality of algorithm portions. The processing devices are coupled to a data network. The parallel data processing system includes an originating module coupled to the data network. The originating module is capable of: (i) receiving the algorithm and the data, (ii) extracting the algorithm portions from the algorithm and the data portions from the data, (iii) sending one of the algorithm portions to one of the processing devices over the data network, and (iv) sending one of the data portions to the one processing device over the data network. A result collation module is in communication with the originating module and the processors. The result collation module is capable of receiving a result signal from the one processor. The result signal indicates the one processor has completed performing the one algorithm portion on the one data portion. The result collation module is further capable of providing a reward signal after receiving the result signal. A reward module is in communication with the result collation module to receive the reward signal. The reward module is capable of identifying a recipient associated with the one processor after receiving the reward signal, and providing the reward to the identified recipient.

DETAILED DESCRIPTION

Figure 1:
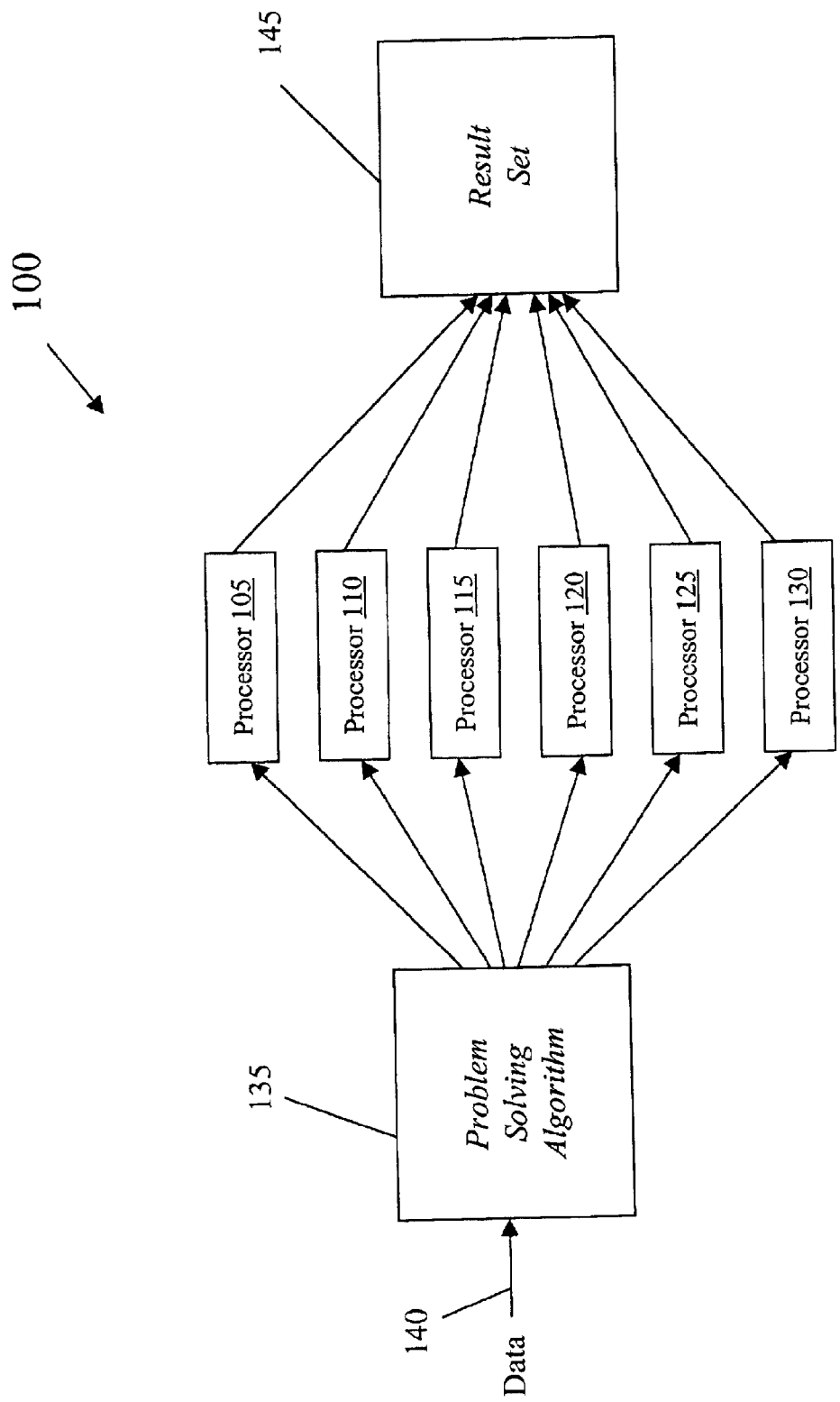
FIG. 1 is a block diagram of a parallel data processing system 100 constructed according to an exemplary embodiment of the present invention.

FIG. 1 shows a parallel data processing system 100 constructed according to an exemplary embodiment of the present invention. The data processing system 100 includes a plurality of processors 105–130. These processors are generally situated in data processing devices or computers such as the exemplary device 400 shown in FIG. 4, described in greater detail below. In one example, the processors 105–130 are situated in any of millions of computers throughout the world.

The data processing devices used in accordance with exemplary embodiments of the present invention are coupled to a data network such as the Internet. Other examples of data networks to which the data processing devices are coupled include frame relay (FR) networks, ATM networks, wide area networks (WAN), and local area networks (LAN) Still other suitable networks 130 include satellite transmission, radio broadcasting, cable television broadcasting, direct line-of-site transmission, telecom fiber optic transmission, cellular transmission, wireless transmission, and other networks known to those skilled in the art.

In FIG. 1, the plurality of processors 105–130 cooperate to solve a job such as an algorithm 135. Data 140 is provided to the algorithm 135. The algorithm 135 can be separated into a plurality of algorithm portions or sub-algorithms and distributed to the various processors 105–130. In one example, each one of the sub-algorithms is delivered with the data to a respective one of the processors 105–130 to define a "task." In another example, the data 140 is separable into a plurality of data portions. Particular data portions are delivered with each of the sub-algorithms to define the task. In another example, the task is simply the sub-algorithm or algorithm provided to a particular processor. The data is provided separately. In another example, the task is the data portion or data. In still further examples, other tasks and jobs known to those skilled in the art are provided to the processors 105–130 for processing.

Using the system of FIG. 1, different parts of the algorithm are generally processed in different processors. The processors 105–130 perform the algorithms or algorithm portions on the data distributed to the respective processors. Processing continues until the particular processor determines an output of the algorithm or result. Each of the processors outputs a result after performing the task distributed to that processor. The results from the various processors 105–130 are marshaled to define a result set 145 for the algorithm. The result set is provided in a desirable format such as an HTML web page, a spreadsheet document, a digital image, and other formats known to those skilled in the art.

In some exemplary embodiments, the data processing system 100 provides the feature of redundancy. In particular, a task delegated to a particular processor is replicated across one or more other processors in the system. By sending the same algorithms and/or data to multiple computers, when a particular computer in the data processing system 100 is unavailable (turned off, disconnected from network, otherwise "offline," etc.), the task assigned to that computer is performed by another computer. This duplication of effort also serves the purpose of checking duplicate results or result sets to ensure that the algorithms produced the same results while running in different environments. A check sum operation, for example, can be performed on the results or result sets to ensure the outputs are consistent.

Figure 2:
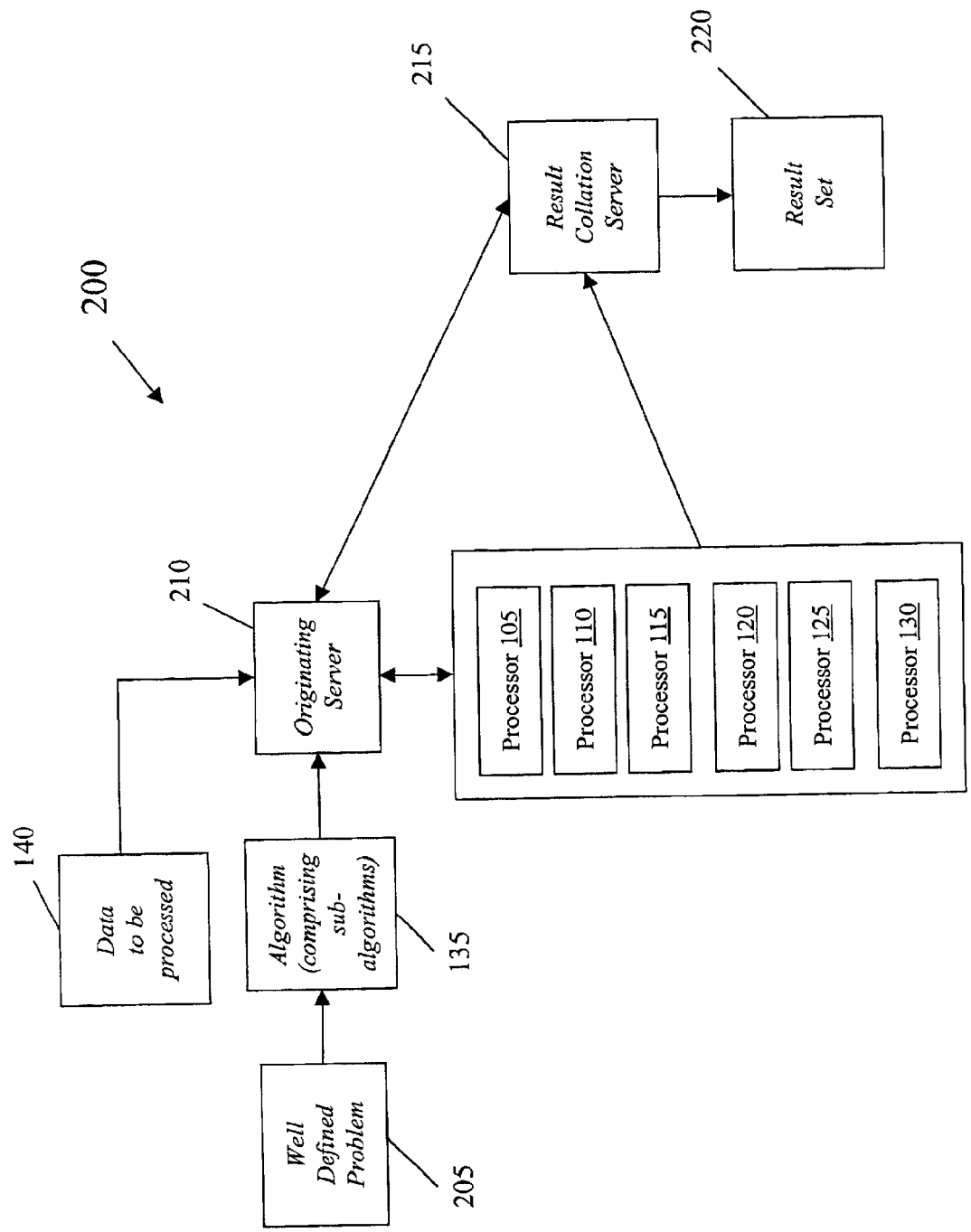
FIG. 2 is a block diagram of a parallel data processing system 200 constructed according to an exemplary embodiment of the present invention.

FIG. 2 is a block diagram of a parallel data processing system 200 constructed according to an exemplary embodiment of the present invention. The parallel processing of data takes place in a number of steps described below with reference to FIG. 2. Some of the steps described can be combined or, conversely, can be separated into a plurality of steps, depending on the preferred embodiment.

In FIG. 2, before the parallel processing takes place, a "well defined" problem 205 is provided. The manner in which problem 205 is defined depends on the particular embodiment, specifically the type of problem to be solved. Generally, "well defined" refers to structuring the problem in a manner that lends itself to parallel processing. For an individual to design a well defined problem, that individual often has knowledge of a desired solution to the problem, or at least the kind of results desired.

In FIG. 2, after providing well defined problem 205, the algorithm 135 is also designed in a manner that lends itself to parallel processing. The algorithm 135 can take many forms. In one exemplary embodiment, the algorithm 135 is comprised of a plurality of sub-algorithms, each of which can be processed independently. In another exemplary embodiment, the algorithm 135 is simple enough to be spread across processors 105–130, while different sets of input data 140 are provided to the different processors 105–130. This method of providing different sets of input data 140 is described in greater detail below with respect to FIG. 3. In one example, the algorithm 135 may be a recursive algorithm. In another example, one or more sub-algorithms within algorithm 135 process the results of other sub-algorithms or algorithms. In yet another example, a first set of sub-algorithms operate in parallel to output a set of results which are then processed by a second set of sub-algorithms or algorithms.

In FIG. 2, the algorithm 135 and data 140 to be processed are provided to an originating server 210, generally over a data network such as the Internet. In one exemplary embodiment, the originating server 210 receives the algorithm 135 and the data 140, and then extracts the sub-algorithms or algorithm portions from algorithm 135. The originating server 210 also extracts the data portions from the data 140. In another exemplary embodiment, the algorithm 135 and data 140 are separated into the appropriate portions before being delivered to the originating server 210.

In FIG. 2, the originating server 210 distributes the algorithm portions and/or data to one or more of the processors 105–130 over the data network. In some exemplary embodiments, originating server 210 replicates the algorithm portions or algorithms across a plurality of the processors 105–130. The same holds true for the data portions or data, as will be understood by the skilled artisan.

Information such as tasks, algorithms and/or data can be packaged in various forms for delivery. In an object oriented data processing system, the information is sent over the data network as an object. An "object" in an object oriented data processing system is a self-contained piece of software consisting of related data and procedures. "Data" means information or space in a computer program where information can be stored, e.g. a name or an inventory part number. Procedures are parts of a program that cause the computer to actually do something, e.g. the parts of a program that perform calculations or the part of a program that stores something on a computer disk. In Object Oriented Technology, an object's procedures are often called operations or "methods." These procedures or methods can be invoked to manipulate the data. The methods are invoked on the object by sending calls to the object.

In object oriented distributed systems based upon the client-server model, there exist servers that provide object oriented interfaces to their clients. These servers support objects consisting of data and the associated software for manipulating the data according to the operations permitted by this type of object. Clients may obtain access to these objects and may execute calls on them by transmitting the calls to the server. At the server these calls are executed via the software associated with the object. The results of these calls are then transmitted back to the client.

Currently, a number of companies have agreed to standardize certain object definitions and interfaces to permit the sharing of such objects with one another. One system, designed to enable participation in such inter-company sharing of objects, is called Distributed Objects Environment ("DOE"), created by Sun Microsystems, Inc. Sun, Distributed Objects Environment, and Sun Microsystems. Inc. are trademarks or registered trademarks of Sun Microsystems, Inc., in the United States and other countries. Distributed Objects Environment is an object-oriented system, providing remote access from clients to DOE objects. Server applications implement DOE objects. For any given DOE object, a DOE server can create an object reference that acts as a pointer to the DOE object. A DOE object reference can be passed around between different processes on one machine or between different machines and it will still point to the original object. When a client application at one location obtains a DOE object reference, it can send calls (method invocation requests) to the target DOE object. The target DOE object can then execute these calls, possibly updating its internal state (its data) and possibly returning some results to its caller. As part of processing a method invocation, a server can itself invoke other objects, creating a chain of object invocations.

For further description of object oriented design and programming techniques see "Object-Oriented Software Engineering" by Ivar Jacobson et al., ACM Press 1992, and "Object-Oriented Software Construction" by Bertrand Meyer, Prentice-Hall 1988, both of which are incorporated herein by reference.

In some exemplary embodiments, tasks are sent to one or more of processors 105–130 for processing over the data network responsive to request signals from the processors and/or the devices in which processors 105–130 are situated. In these embodiments, the request signal is sent from a processing device to the originating server 210 over the data network when the requesting device is available to process tasks. In one example, software operating in the requesting device monitors the availability of the processor within that device and sends request signals in the form of email messages. The request signal includes an identification number which identifies the requesting processor.

In FIG. 2, the originating server 210 monitors the particular data and/or algorithms distributed to the various processors. In one exemplary embodiment, a table is maintained in a memory medium within or accessible by originating server 210. A first column of the table includes a list of numbers or other information that identify the various processors 105–130. A second column in the table includes a list of the algorithms and/or data delivered to the respective processors itemized in the first column. The table is updated regularly, as will be appreciated by the skilled artisan. In a larger scale example, this table is in the form of a master database accessible by the originating server 210. The table includes a listing of thousands or millions of processor identification numbers with data network addresses such as IP addresses for data processing devices coupled to the Internet.

Figure 4:
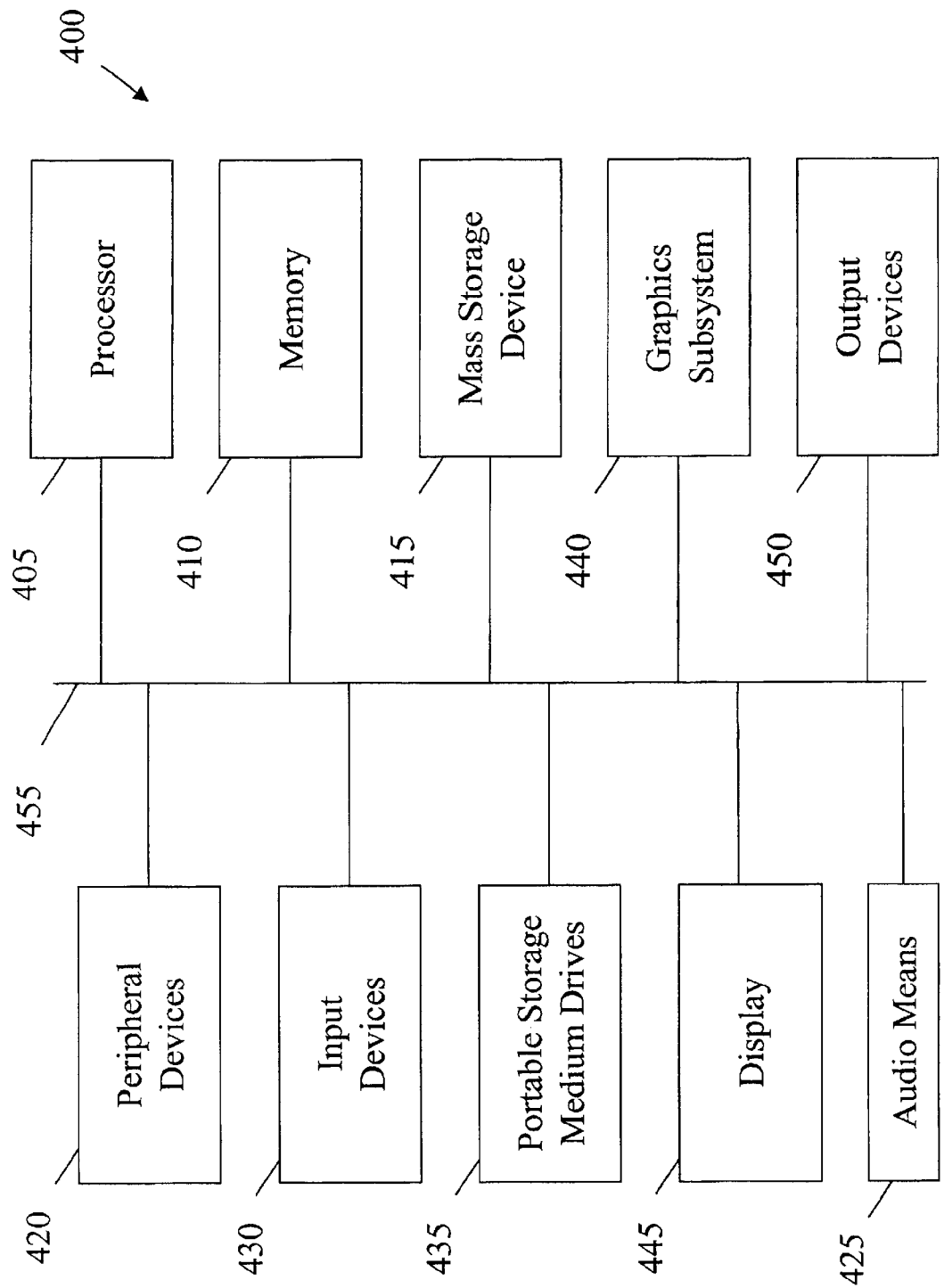
FIG. 4 is a block diagram of a data processing device 400 constructed according to an exemplary embodiment of the present invention.

FIG. 4 shows an exemplary data processing device 400 having a processor 405 used in accordance with parallel data processing system 200. When a task is received by the device 400, the task is stored in a memory 410 within the device 400. The algorithm or algorithm portion can then be extracted from the task, as can the data or data portion. The processor 405 retrieves the algorithm portion and the data portion from the memory 410. In exemplary embodiments incorporating object oriented technology, the extraction and retrieval described above simply involve executing an object representing the task. In other exemplary embodiments which may or may not incorporate object oriented technology, executable instructions representing the algorithm portion or algorithm are delivered to the data processing device 400 and stored in memory 410. The processor 405 retrieves these instructions and the data from memory 410 and executes the instructions to perform the algorithm on the data.

The algorithms and data are spread across multiple processors and processed. Because the problem 205 is well defined, the delivered algorithm processes the data until a result is determined. In some exemplary embodiments, an operating system and/or software application within the processing device controls execution of the algorithm to process the data at an intelligent time, that is, so as not to interfere with other tasks to be executed. For example, if a user wants to print a document, he can do so without the central processing unit ("CPU") within his computer being usurped by imported external algorithms.

In FIG. 2, a result collation server 215 is in communication with the originating server 210 and the processors 105–130, for instance, over a data network as described above. When a task is completed by one of the processors 105–130, that processor outputs a result. Generally this result is simply data output by the processor after performing the sub-algorithm on the data delivered to that processor. The result is sent as a signal to the result collation server 215. The result signal indicates to the result collation server 215 that the processor sending the result signal has completed the task assigned to that processor. In one alternative embodiment, the result signal does not include the output data, but is simply a message indicating that processing is complete. In exemplary embodiments, the result signal also includes information identifying the processor from which the result was sent.

In FIG. 2, the results from the various processors 105–130 are received by the result collation server 215. The result collation server 215 analyzes and organizes the results into a recognizable pattern, or result set 220. When there are missing results (e.g., because some of the processors were unable to complete processing or otherwise unable to send a result), the result collation server 215 requests the results from originating server 210. Upon receiving this request, the originating server again delegates the task corresponding to the missing result to one or more processors 105–130 for processing, preferably to processors other than the one which first failed to provide the result.

In FIG. 2, the result set 220 is sent to originating server 210 after assembly by result collation server 215. In this way, the originating server 210 thus interprets and combines results provided from result collation server 215. Moreover, as particular processors send result signals to result collation server 215, the result collation server 215 sends "processor available" signals to originating server 210, the signals having identification numbers indicating particular processors which are available for further processing. The originating server 210 can then send further data and algorithms to those processors as necessary.

In FIG. 2, the result collation server 215 monitors the progress of processors 105–130 as those processors perform the assigned tasks. In some exemplary embodiments, each processor sends report signals to result collation server 215. The report signal includes information identifying the processor (e.g., ID# 2064), approximately how much of the task has been completed (e.g., task is 20% complete), and/or the amount of processing time expired. The report signal is sent periodically (e.g., every 5 minutes), or at predetermined stages of the algorithm, depending on the desired implementation. The result collation server 215 thus monitors the status of processing for each processor.

In FIG. 2, the originating server 210 and result collation server 215 represent one exemplary embodiment of the methods and functions performed by those servers. In this exemplary embodiment, a first software application interacts with the hardware of originating server 210 to define an "originating module," and a second software application interacts with the hardware of result collation server 210 to define a "result collation module." The originating module performs the methods and functions of the originating server as described above, and the result collation module performs the methods and functions of the result collation server.

In other exemplary embodiments, the originating server may or may not be separated from the result collation server. In one exemplary embodiment, the originating server and result collation server are merged so that the originating module and result collation module are resident in different address spaces of the same server, computer or other data processing device. In another exemplary embodiment, the originating module is embodied as a plurality of servers or computers interacting with one another to provide the functions of originating server 210, and the result collation module is similarly embodied in a different plurality of servers or computers.

Figure 3:
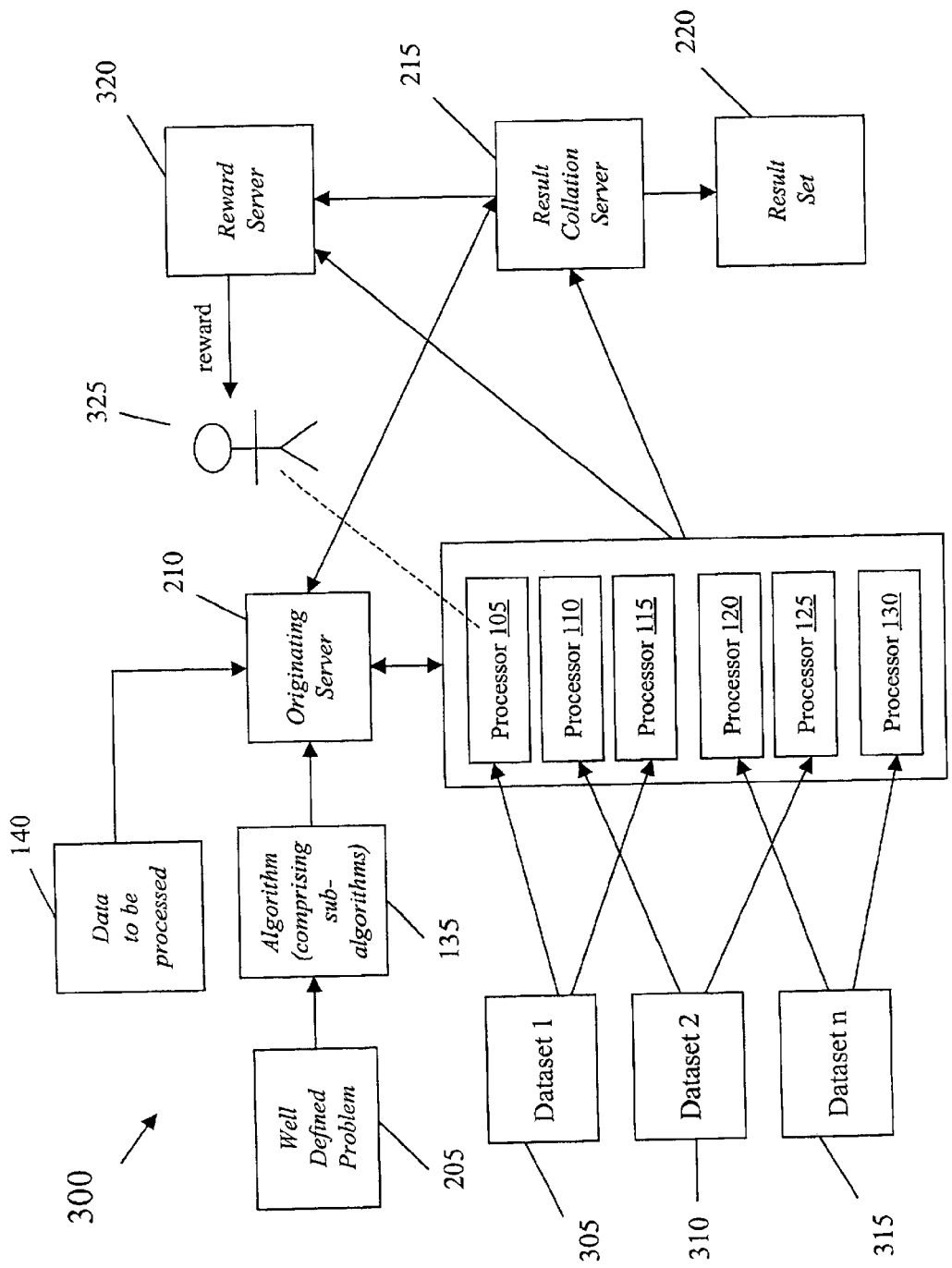
FIG. 3 is a block diagram of a parallel data processing system 300 constructed according to an exemplary embodiment of the present invention.

FIG. 3 is a block diagram of a parallel data processing system 300 constructed according to an exemplary embodiment of the present invention. Parallel data processing system 300 shares many of the features of system 200 and has additional features. System 300 is configured so that processors 105–130 receive a plurality of datasets 305–315 for processing. Originating server 210 distributes algorithms and/or algorithm portions to respective processors 105–130. In one exemplary embodiment, a particular algorithm portion is replicated across processors 105 and 115. Dataset 305 is provided to both processors 105 and 115 for redundancy. In another exemplary embodiment, processor 105 receives a first algorithm portion while processor 115 receives a second algorithm portion different from the first algorithm portion. Both algorithm portions operate on the same dataset 305.

In FIG. 3, a reward server 320 is in communication with the processors 105–130 and result collation server 215, for instance, over a data network such as the Internet. In some exemplary embodiments, the processors communicate directly with the reward server 320. In other exemplary embodiments, the processors communicate with the reward server through the result collation server 215.

The reward server 320 provides a reward to a recipient 325 associated with a particular processor 105 or data processing device in which the processor 105 is situated after the processor completes a task. The reward is provided to the recipient 325 for use of the processor. In some exemplary embodiments, one recipient is associated with the plurality of processors 105–130, while in other embodiments, each processor 105–130 is associated with a different recipient. The recipient is typically an owner of the processor with which he is associated.

In FIG. 3, the result collation server 215 is capable of receiving a result signal from one of the processors 105–130 when that processor has completed performing the algorithm portion on the data portion delivered to that processor. The result collation server 215 is further capable of sending a reward signal to reward server 320 after receiving the result signal. The reward signal includes information identifying the processor which delivered the result and, in some embodiments, the amount of processing time expired. In this way, an appropriate reward can be provided to recipient 325 as described in greater detail below. Upon receiving the reward signal, reward server 320 identifies recipient 325 as being associated with the one processor and provides the reward to the identified recipient. The identification is achieved, for instance, by accessing a database in which various recipients are associated with particular processors 105–130. In one example of providing the reward, a check is printed and mailed to recipient 325. In another example, a fee is electronically deposited in an account maintained on behalf of recipient 325 by a financial institution.

The recipient coordinates with originating server 210 and reward server 320 to receive a reward for use of the processor he owns. A user signs on to become a recipient by installing software on his data processing device. During the installation process, the user is presented with business terms which are displayed as electronic text on a display screen. For example, "user agrees to provide CPU for processing in exchange for $X for Y amount of processing time." The user is presented with several reward options such as weekly/monthly payments, hourly payments, a flat fee, etc. After selecting the desired reward option, an agreement is entered into between the user and an entity associated with the originating server 210 such as an individual, group of individuals, corporation or other organization. The owner of a CPU is selling the "services" that his CPU can provide to the algorithm. The entity responsible for disseminating the algorithms, in turn, is compensating owners of the processors on which the algorithms are executed for generating the answer to some problem.

When the reward is in the form of payment, the manner in which the recipient is compensated can take many forms. In one exemplary embodiment, the payment is a recurring flat fee. For example, a pharmaceutical company, the entity associated with the originating server, pays the owner of a CPU $5 a month for use of the CPU. In another exemplary embodiment, the payment is a one-time fee. For example, the pharmaceutical company pays the owner of a CPU $20 for use of the CPU during off-peak usage for the life of the CPU. Another exemplary embodiment relates to a CPU-relative fee. For example, the pharmaceutical company pays the user 5 cents for every 10 megabytes of data processed. Yet another exemplary embodiment involves a revenue-sharing fee. For example, the pharmaceutical company will pay the user a portion of the profits generated from new products researched on the CPU owned by that user. Still another exemplary embodiment involves a recurring service-sharing fee, similar to the previous example. Rather than using the results of the massively parallel processing to create a new product, the massively parallel processing performs a recurring service for one or more companies. For example, the pharmaceutical company has a series of algorithms that can be reused by other businesses for their own purposes. These other businesses pay the pharmaceutical company a fee for use of their massively parallel processing environment, and the pharmaceutical company, in turn, shares this revenue with the individual owners of the processors. Other types of CPU-relative payment plans are contemplated within the scope of the present invention. Payments are made based on the report signals and/or results sent from the processors 105–130 to result collation server and reward server 320

Many businesses spend large amounts of research and development funds on research equipment. These businesses can use the apparatus and methods described above as another "arm" of this research equipment. In some scenarios, the data processing system 300 may be faster by several orders of magnitude at a relatively inexpensive price compared with the price of having comparable computational equipment in a lab. Purchasing such a quantity of equipment would not only be cost prohibitive, but also technologically infeasible to simulate millions of CPUs working in concert.

Some R&D departments currently spend millions of dollars on equipment to test antigens, financial stock trend analysis, earthquake-proof architectural designs, wind shear on new cars, weight-acceleration ratio on new fighter jets, viral vaccines, human genome sequences, etc. Each of these testing methodologies can be expedited by using the methods described above. In so doing, many organizations will enter a mutually beneficial contract whereby CPU usage is traded for accelerated research and development initiatives.

For instance, a pharmaceutical company is researching a drug that will reverse the effects of Alzheimer's. Most of the R&D costs are spent for in-lab processing devices that can simulate and test various compounds in various situations. The recursive algorithms are much too robust to be handled by all but the most expensive computers, and would probably not be completed in a reasonable time frame. The pharmaceutical company benefits by using millions of unused CPUs throughout the world. Each of the CPUs is assigned a small portion of the problem, solves the problem, and then sends results to a series of result collation servers over a data network. The network infrastructure simulates a neural net, where each node is used for a specific purpose. In exchange for these services, the pharmaceutical company pays the respective owners of the CPU a fee. The nature of this payment can take many forms. The fee can be a flat rate, the fee can be based on the relative processing power and time required by the CPU for processing, or the fee can be based on sharing in the revenue of any subsequent drugs that are produced with the assistance of that particular CPU.

FIG. 4 is a block diagram of a data processing apparatus 400 that can be incorporated as part of both the data processing devices in which processors 105–130 are situated and/or the servers described above. The data processing apparatus 400 includes a processor 405 for executing program instructions stored in a memory 410. In some embodiments, processor 405 includes a single microprocessor, while in others, processor 405 includes a plurality of microprocessors to define a multi-processor system.

In FIG. 4, the memory 410 stores instructions and data for execution by processor 405, including instructions and data for performing the methods described above. Depending upon the extent of software implementation in data processing apparatus 400, the memory 410 stores executable code when in operation. The memory 410 includes, for example, banks of read-only memory (ROM), dynamic random access memory (DRAM), as well as high-speed cache memory. In one exemplary embodiment, the cache memory has a first area to download algorithms and store the algorithms locally for the processor 405. The cache memory has a second area for storing data provided by originating server 210 or downloaded from a database, and a third area for storing results.

In FIG. 4, within data processing apparatus 400, an operating system comprises program instruction sequences that provide a platform for the methods described above. The operating system provides a software platform upon which application programs may execute, in a manner readily understood by those skilled in the art. The data processing apparatus 400 further comprises one or more applications having program instruction sequences for performing the methods described above.

In FIG. 4, the data processing apparatus 400 incorporates any combination of additional devices. These include, but are not limited to, a mass storage device 415, one or more peripheral devices 420, an audio means 425, one or more input devices 440, one or more portable storage medium drives 445, a graphics subsystem 440, a display 457 and one or more output devices 450. The various components are connected via an appropriate bus 455 as known by those skilled in the art. In alternative embodiments, the components are connected through other communications media known in the art. In one example, processor 405 and memory 410 are connected via a local microprocessor bus; while mass storage device 415, peripheral devices 420, portable storage medium drives 435, and graphics subsystem 440 are connected via one or more input/output ("I/O") buses.

In FIG. 4, mass storage device 415 is implemented as fixed and/or removable media, for example, as a magnetic, optical, or magneto-optical disk drive. The drive is preferably a non-volatile storage device for storing data and instructions for use by processor 405. In some embodiments, mass storage device 415 stores client and server information, code for carrying out methods in accordance with exemplary embodiments of the invention, and computer instructions for processor 405. In other embodiments, computer instructions for performing methods in accordance with exemplary embodiments of the invention also are stored in processor 405. The computer instructions are programmed in a suitable language such as Java or C++.

In FIG. 4, the portable storage medium drive 435, in some embodiments, operates in conjunction with a portable non-volatile storage medium, such as a floppy disk, CD-ROM, or other computer-readable medium, to input and output data and code to and from the data processing apparatus 400. In some embodiments, methods performed in accordance with exemplary embodiments of the invention are implemented using computer instructions that are stored on such a portable medium and input to the data processing apparatus 400 via portable storage medium drive 435.

In FIG. 4, the peripheral devices 420 include any type of computer support device, such as an I/O interface, to add functionality to data processing apparatus 400. In one example, the peripheral devices include a network interface card for interfacing the data processing apparatus 400 to a network, a modem, and the like. The peripheral devices also include input devices to provide a portion of a user interface and may include an alphanumeric keypad or a pointing device such as a mouse, a trackball, a stylus, or cursor direction keys. The I/O interface comprises conventional circuitry for controlling input devices and performing particular signal conversions upon I/O data. The I/O interface may include, for example, a keyboard controller, a serial port controller, and/or digital signal processing circuitry.

In FIG. 4, the graphics subsystem 440 and the display 445 provide output alternatives of the system. The graphics subsystem 440 and display 445 include conventional circuitry for operating upon and outputting data to be displayed, where such circuitry preferably includes a graphics processor, a frame buffer, and display driving circuitry. The display 445 may include a cathode ray tube (CRT) display, a liquid crystal display (LCD), or other suitable devices. The display 445 preferably can display at least 256 colors. The graphics subsystem 440 receives textual and graphical information and processes the information for output to the display 445. A video card in the data processing apparatus 400 also comprises a part of graphics subsystem 440 and also preferably supports at least 256 colors. For optimal results in viewing digital images, the user should use a video card and monitor that can display the True Color (24 bit color) setting. This setting enables the user to view digital images with photographic image quality.

In FIG. 4, audio means 425 preferably includes a sound card, on-board sound processing hardware, or a device with built-in processing devices that attach via Universal Serial Bus (USB) or IEEE 1394 (Firewire). The audio means 425 receives audio signals from a peripheral microphone. In addition, audio means 425 may include a processor for processing sound. The signals can be processed by the processor in audio means 425 of data processing apparatus 400 and passed to other devices as, for example, streaming audio signals.

In some embodiments, programs for performing methods in accordance with exemplary embodiments of the invention are embodied as computer program products. These generally include a storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card, smart card, and other media.

Stored on one or more of the computer readable media, the program includes software for controlling both the hardware of a general purpose or specialized computer or microprocessor. This software also enables the computer or microprocessor to interact with a human or other mechanism utilizing the results of exemplary embodiments of the invention. Such software includes, but is not limited to, device drivers, operating systems and user applications. Preferably, such computer readable media further include software for performing the methods described above.

In certain other embodiments, a program for performing an exemplary method of the invention or an aspect thereof is situated on a carrier wave such as an electronic signal transferred over a data network. Suitable networks include the Internet, a frame relay network, an ATM network, a wide area network (WAN), or a local area network (LAN). Those skilled in the art will recognize that merely transferring the program over the network, rather than executing the program on a computer system or other device, does not avoid the scope of the invention.

Data processing systems constructed according to exemplary embodiments of the present invention provide a massively parallel processing scheme to efficiently determine solutions to complex problems, that is, problems that would require a large amount of time to process on a single computer system. In one example, the processing power of the millions of computers that are now networked via the Internet is harnessed so that these computers operate collectively to solve complex problems in a reasonable amount of time. When these problems are solved, the entity responsible for delegating tasks for processing as well as the individuals associated with the respective computers benefit financially. Moreover, research and development efforts of modern technological organizations are accelerated.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. In a parallel data processing system including a plurality of data processing devices coupled to a network, each of the data processing devices having a processor, a method for providing a reward for use of each data processing device, the method comprising:

providing an algorithm including a plurality of algorithm portions;

providing data including a plurality of data portions;

selecting at least two of the plurality of data processing devices in order to use their processing abilities;

sending over the network, from a single originating module, a task to each of the at least two data processing devices coupled to the network, wherein the single originating module sends the task, the task including both at least one of the algorithm portions sent from the single originating module and at least one of the data portions sent from the single originating module, wherein the processor of each selected data processing device performs the at least one algorithm portion on the at least one data portion; and providing the reward to a recipient associated with each selected data processing device.

2. The method of claim 1, wherein the reward is a payment.

3. The method of claim 2, wherein the payment is a flat fee.

4. The method of claim 2, wherein the payment is a recurring flat fee.

5. The method of claim 2, wherein the payment is a one-time fee.

6. The method of claim 2, wherein the payment is a fee computed based on CPU time that the each processor used to perform the at least one portion of the algorithm on the at least one portion of the data.

7. The method of claim 2, wherein the payment is a revenue-sharing fee.

8. The method of claim 2, wherein the payment is a recurring service-sharing fee.

9. The method of claim 1, wherein the at least two data processing devices are selected based on availability.

10. The method of claim 1, wherein a request signal is received from each processing device over the data network when each processing device is available to process tasks.

11. In a parallel data processing system including a plurality of data processing devices coupled to a network, each of the data processing devices having a processor, at least one of the data processing devices being associated with a respective recipient, a method for providing a reward for use of each data processing device, the method comprising:

selecting at least two of the data processing devices;

providing, by a single originating module, instructions relating to both at least one portion of an algorithm and at least one portion of data, to each of at least two data processing devices storing the instructions in each selected data processing device; retrieving, by the processor of each selected data processing device, the instructions, wherein the processor executes the instructions to perform the at least one portion of the algorithm on the at least one portion of the; and providing the reward to the recipient associated with each selected data processing device.

12. The method of claim 11, wherein the reward is a payment.

13. The method of claim 12, wherein the payment is a flat fee.

14. The method of claim 12, wherein the payment is a recurring flat fee.

15. The method of claim 12, wherein the payment is a one-time fee.

16. The method of claim 12, wherein the payment is a fee computed based on CPU time that each processor used to perform the at least one portion of the algorithm on the at least one portion of the data.

17. The method of claim 12, wherein the payment is a revenue-sharing fee.

18. The method of claim 12, wherein the payment is a recurring service-sharing fee.

19. A parallel data processing system for providing a reward for use of one of a plurality of processing devices to process data using an algorithm, the data including a plurality of data portions, the algorithm including a plurality of algorithm portions; the plurality of processing devices coupled to a network, the parallel data processing system comprising:

a single originating module, coupled to the network, the single originating module capable of:
i) receiving the algorithm and the data,
ii) extracting the plurality of algorithm portions from the algorithm and the plurality of data portions from the data,
iii) selecting at least two of the plurality of data processing devices in order to use their processing abilities; and
iv) sending both at least one of the algorithm portions and
at least one of the data portions to each of the selected data processing devices over the network;

a result collation module in communication with the single originating module and a processor of each of the selected processing devices, the result collation module capable of:
i) receiving a result signal from the processor of each of the selected data processing devices, the result signal indicating that each processor has completed performing the at least one algorithm portion on the at least one data portion, and
ii) providing a reward signal after receiving the result signal; and a reward module in communication with the result collation module, the reward module capable of:
i) receiving the reward signal from the collation module,
ii) identifying the recipient associated with each of the data processing devices after receiving the reward signal, and
iii) providing the reward to each identified recipient.

20. The system of claim 19, wherein the reward is a payment.

21. The system of claim 20, wherein the payment is a flat fee.

22. The system of claim 20, wherein the payment is a recurring flat fee.

23. The system of claim 20, wherein the payment is a one-time fee.

24. The system of claim 20, wherein the payment is a fee computed based on CPU time that each processor used to perform the at least one portion of the algorithm on the at least one portion of the data.

25. The system of claim 20, wherein the payment is a revenue-sharing fee.

26. The system of claim 20, wherein the payment is a recurring service-sharing fee.

* * * * *

UNITED STATES PATENT AND TRADEMARK OFFICE
CERTIFICATE OF CORRECTION

PATENT NO.      : 6,996,548 B2                                          Page 1 of 1
APPLICATION NO. : 09/853841
DATED           : February 7, 2006
INVENTOR(S)     : Raymond F. Ratcliff, III It is certified that error appears in the above-identified patent and that said Letters Patent is hereby corrected as shown below:

Claim 11, line 18 (Column 13, line 14), after "portion of the" insert --data--.

Signed and Sealed this

Nineteenth Day of December, 2006

JON W. DUDAS
*Director of the United States Patent and Trademark Office*